(12) United States Patent
Stubblefield

(10) Patent No.: US 10,759,239 B1
(45) Date of Patent: Sep. 1, 2020

(54) BEAD BAND CLAMP

(71) Applicant: LaVern R. Stubblefield, Hallsville, TX (US)

(72) Inventor: LaVern R. Stubblefield, Hallsville, TX (US)

( * ) Notice: Subject to any disclaimer, the term of this patent is extended or adjusted under 35 U.S.C. 154(b) by 0 days.

(21) Appl. No.: 16/388,420

(22) Filed: Apr. 18, 2019

(51) Int. Cl.
*B23P 19/00* (2006.01)
*B60C 25/14* (2006.01)

(52) U.S. Cl.
CPC ...... *B60C 25/145* (2013.01); *B60C 2200/065* (2013.01)

(58) Field of Classification Search
CPC .... B25B 1/00; B25B 1/02; B25B 1/04; B25B 3/00; B25B 5/00
See application file for complete search history.

(56) References Cited

U.S. PATENT DOCUMENTS

| 2,642,905 | A | * | 6/1953 | Hewat | B25B 5/003 |
| | | | | | 269/93 |
| 3,500,891 | A | | 3/1970 | Collins | |
| 3,599,698 | A | | 8/1971 | Skehan et al. | |
| 3,995,676 | A | | 12/1976 | Casey | |
| 4,043,375 | A | | 8/1977 | Casey | |
| 4,234,176 | A | * | 11/1980 | Goff | B25B 5/109 |
| | | | | | 269/156 |
| 4,962,918 | A | * | 10/1990 | Yang | B25B 5/003 |
| | | | | | 269/156 |
| 5,022,451 | A | | 6/1991 | Fenderson | |
| 5,513,838 | A | * | 5/1996 | Van Rossum | B25B 5/003 |
| | | | | | 269/203 |
| 7,048,267 | B2 | * | 5/2006 | Bries | B25B 5/006 |
| | | | | | 269/224 |
| 8,226,074 | B1 | * | 7/2012 | Hughey | B25B 5/006 |
| | | | | | 269/155 |
| 8,322,697 | B2 | * | 12/2012 | Lin | B25B 5/003 |
| | | | | | 269/143 |

(Continued)

FOREIGN PATENT DOCUMENTS

WO    WO/2001/025035    12/2001

*Primary Examiner* — Lee D Wilson
(74) *Attorney, Agent, or Firm* — R. Keith Harrison

(57) ABSTRACT

Methods of inflating a tire on a wheel assembly having a rim, an inflation port in the rim, a bead seat band over the inflation port, an O-ring between the rim and the bead seat band, at least one radial port in the bead seat band and the tire over the bead seat band may include obtaining at least one bead band clamp including a main clamp portion, a band portion extending from the main clamp portion, a rim portion extending from the main clamp portion in spaced-apart relationship to the band portion, a first rim engaging assembly carried by the rim portion and a second rim engaging assembly carried by the main clamp portion; aligning the at least one radial port in the bead seat band with the O-ring; deploying the at least one bead band clamp in place on the wheel assembly by engagement of the band portion with the bead seat band and engagement of the first rim engaging assembly and the second rim engaging assembly with the rim; inflating the tire; and removing the at least one bead band clamp from the wheel assembly. A bead band clamp which facilitates inflation of a tire on a wheel assembly is also disclosed.

6 Claims, 10 Drawing Sheets

(56) References Cited

U.S. PATENT DOCUMENTS

| | | | |
|---|---|---|---|
| 8,505,892 B2* | 8/2013 | Seidel | B25B 5/003 269/249 |
| 2013/0140750 A1* | 6/2013 | Allred, III | B25B 5/102 269/249 |

* cited by examiner

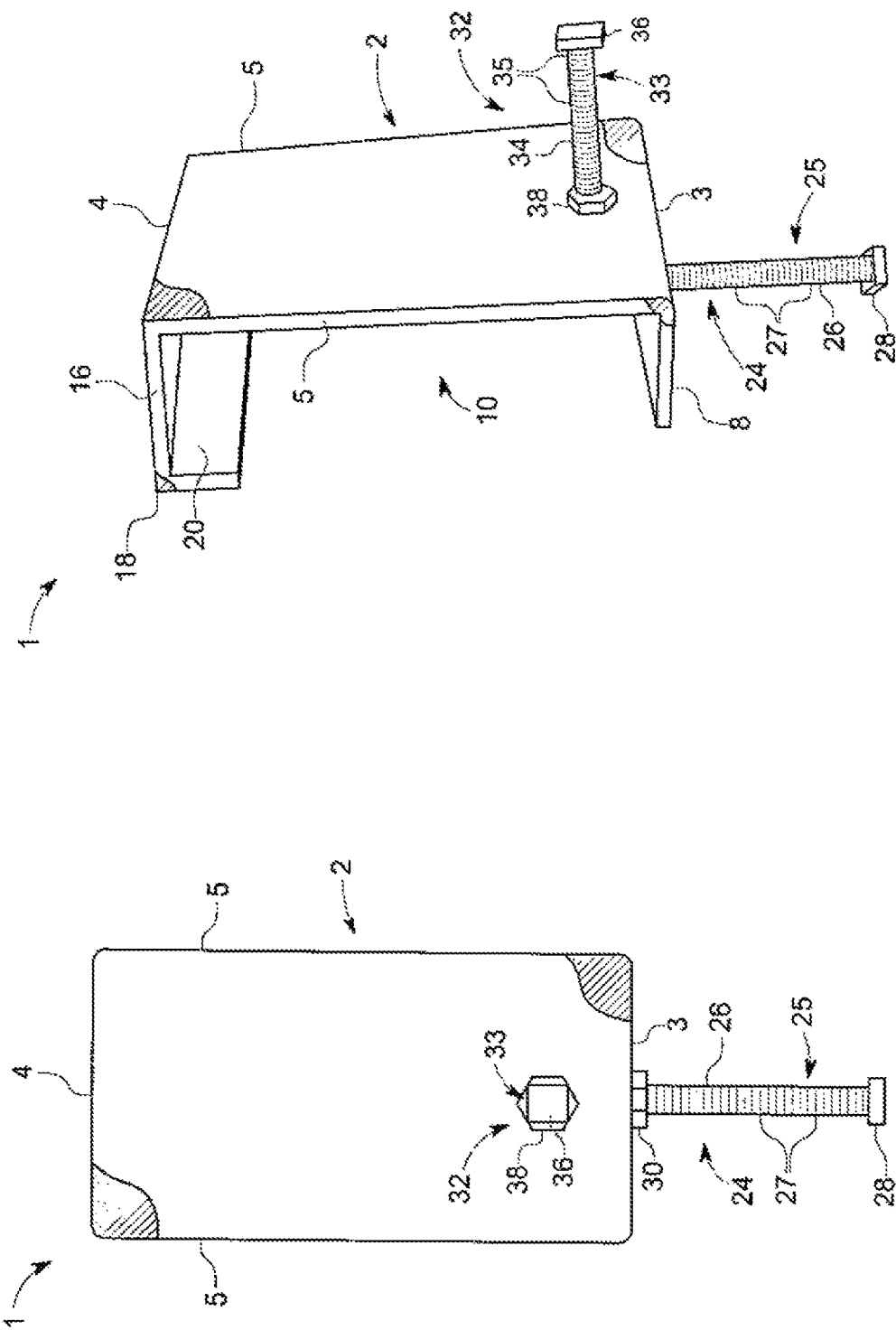

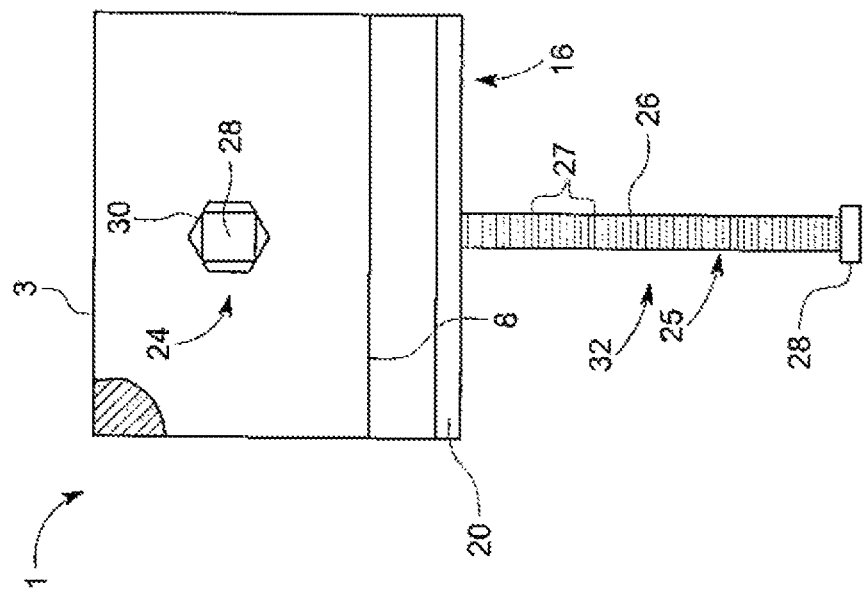
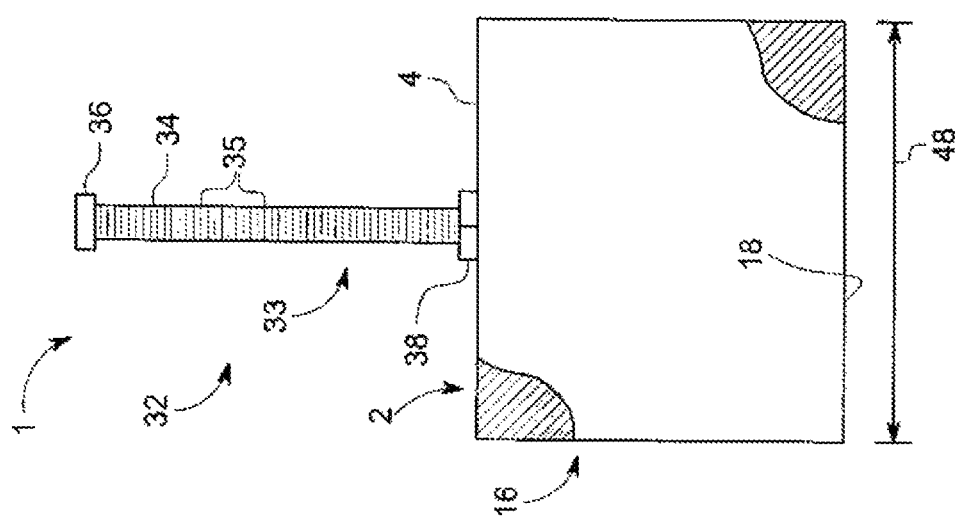

BEAD BAND CLAMP

FIELD

Illustrative embodiments of the disclosure relate to tire inflation tools and methods. More particularly, illustrative embodiments of the disclosure relate to bead band clamps for holding a bead seat band in an inflation position on the wheel rim of a vehicle to facilitate tire inflation.

BACKGROUND

The background description provided herein is solely for the purpose of generally presenting the context of the illustrative embodiments of the disclosure. Aspects of the background description are neither expressly nor impliedly admitted as prior art against the claimed subject matter.

Off-the-road (OTR) earth-moving vehicles are commonly used to transport large quantities of earth in various mining and other industrial applications. Such vehicles may utilize large wheel assemblies which may have multiple components. Each wheel assembly may include a wheel rim. A pair of spaced-apart, front and rear bead seat bands may be positioned on the wheel rim. An O-ring may seal the interface between the wheel rim and each corresponding bead seat band.

A pair of front and rear retainer flanges may be positioned over the respective bead seat bands. A tire may be mounted on the wheel rim between the retainer flanges. An inflation port may be provided in the wheel rim. A bead space between the wheel rim and the bead seat band may communicate with the inflation port. The interior of the tire may communicate with the bead space. Accordingly, in tire inflation, pressurized air may be introduced into the tire through the inflation port and the bead space, respectively.

The bead seat bands may be capable of sliding with respect to the wheel rim. Accordingly, a pair of front and rear lock rings may be seated in a pair of respective lock ring grooves in the wheel rim. The lock rings may prevent the bead seat bands from inadvertently sliding off the wheel rim.

A plurality of radial ports may extend through the front bead seat band on each wheel assembly. When the bead seat band is in an inflation position on the wheel rim, the radial ports may register with the O-ring between the wheel rim and the bead seat hand. In inflation of the tire, the O-ring may thus ensure that the pressurized air flows from the inflation port through the bead space and into the tire, respectively.

When the bead seat band is not in the inflation position on the wheel rim, the radial ports may communicate with the bead space such that the air flows from the inflation port to the atmosphere instead of into the tire. It may thus be necessary to position and retain the bead seat band in the inflation position on the wheel rim to ensure inflation of the tire.

Accordingly, a bead band clamp for holding a bead seat band in an inflation position on the wheel rim of a vehicle to facilitate tire inflation may be desirable for some applications.

SUMMARY

Illustrative embodiments of the disclosure are generally directed to methods of inflating a tire on a wheel assembly having a rim, an inflation port in the rim, a bead seat band over the inflation port, an O-ring between the rim and the bead seat band, at least one radial port in the bead seat band and the tire over the bead seat band. An illustrative embodiment of the methods may include obtaining at least one bead band clamp including a main clamp portion, a band portion extending from the main clamp portion, a rim portion extending from the main clamp portion in spaced-apart relationship to the band portion, a first rim engaging assembly carried by the rim portion and a second rim engaging assembly carried by the main clamp portion; aligning the at least one radial port in the bead seat band with the O-ring; deploying the at least one bead band clamp in place on the wheel assembly by engagement of the band portion with the bead seat band and engagement of the first rim engaging assembly and the second rim engaging assembly with the rim; inflating the tire; and removing the at least one bead band clamp from the wheel assembly.

Illustrative embodiments of the disclosure are further generally directed to a bead band clamp which facilitates inflation of a tire on a wheel assembly having a rim, an inflation port in the rim, a bead seat band over the inflation port, an O-ring between the rim and the bead seat band, at least one radial port in the bead seat band and the tire over the bead seat band. An illustrative embodiment of the bead band clamps may include a main clamp portion. A band portion may extend from the main clamp portion. A rim portion may extend from the main clamp portion in spaced-apart relationship to the band portion. A first rim engaging assembly may be carried by the rim portion. The first rim engaging assembly may have a first axis of engagement. A second rim engaging assembly may be carried by the main clamp portion. The second rim engaging assembly may have a second axis of engagement perpendicular to the first axis of engagement of the first rim engaging assembly.

BRIEF DESCRIPTION OF THE DRAWINGS

Illustrative embodiments of the disclosure will now be described, by way of example, with reference to the accompanying drawings, in which:

FIG. 1 is a rear view of an illustrative embodiment of the bead band clamp;

FIG. 2 is a rear perspective view of the illustrative bead band clamp;

FIG. 5 is a top view of the illustrative bead band clamp:

FIG. 6 is a bottom view of the illustrative bead band clamp:

DETAILED DESCRIPTION

Figure 4:
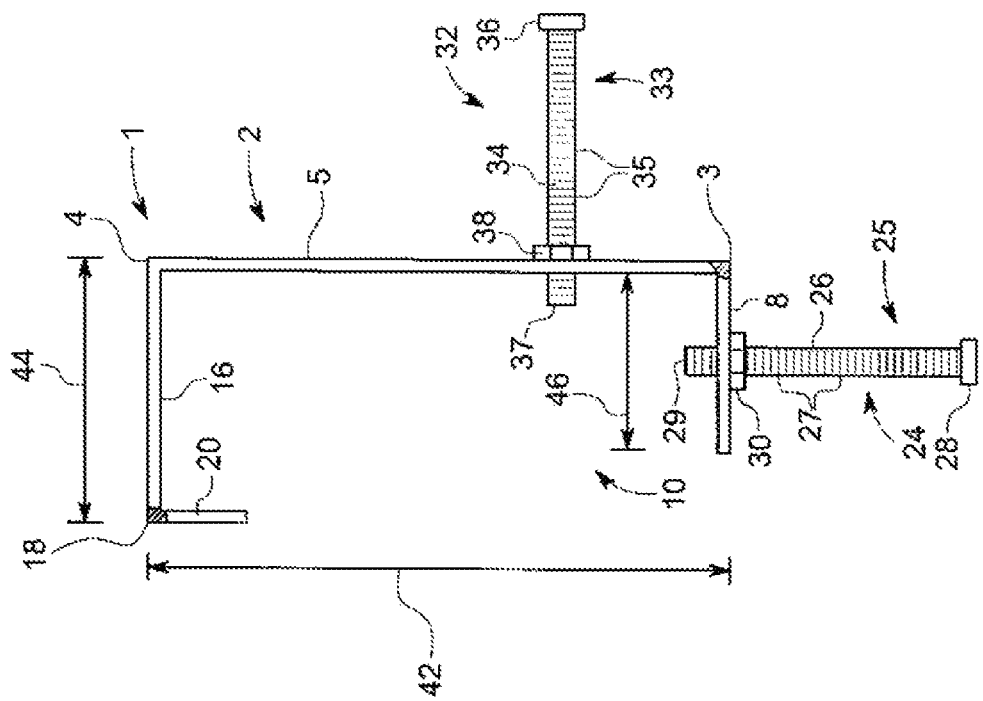
FIG. 4 is a left-side view of the illustrative bead band clamp.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left". "rear", "right", "front", "vertical", "horizontal", "inner", and derivatives thereof shall relate to the invention as oriented in FIG. 9. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIGS. 9-15 of the drawings, an illustrative embodiment of the bead band clamp is generally indicated by reference numeral 1. In typical application, which will be hereinafter further described, at least one bead band clamp 1 may be used to hold a bead seat band 64 in an inflation position (FIGS. 10, 11 and 13-15) on a wheel rim 51 of a wheel assembly 50 which may be provided on an off-the-road (OTR) vehicle to facilitate inflation of a tire 76 (illustrated in phantom in FIGS. 9 and 10) on the wheel rim 51. In some applications, the wheel assembly 50 may be provided on an off-the-road (OTR) earth-moving vehicle which may be used to transport large volumes of earth in mining or other industrial applications. For example and without limitation, in some applications, the wheel assembly 50 may be provided on a CATERPILLAR® 785G mining truck or a KUMATSU® 1500 haul truck. Such vehicles may require the use of large off-the-road (OTR) tires 76 as is known by those skilled in the art. In other applications, the wheel assembly 50 may be provided on other types of vehicles of various sizes.

Referring next to FIGS. 1-8 of the drawings, the bead band clamp 1 may include a main clamp portion 2. As illustrated in FIGS. 1 and 2, in some embodiments, the main clamp portion 2 may be planar and generally elongated and rectangular. Accordingly, the main clamp portion 2 may have a rim end edge 3 and a band end edge 4. The rim end edge 3 and the band end edge 4 may be parallel and spaced-apart with respect to each other. A pair of elongated, parallel, spaced-apart side edges 5 may extend between the rim end edge 3 and the band end edge 4.

A rim portion 8 may extend from the rim end edge 3 of the main clamp portion 2. In some embodiments, the rim portion 8 may be planar. The plane of the rim portion 8 may be oriented in generally perpendicular relationship to the plane of the main clamp portion 2.

Figure 3:
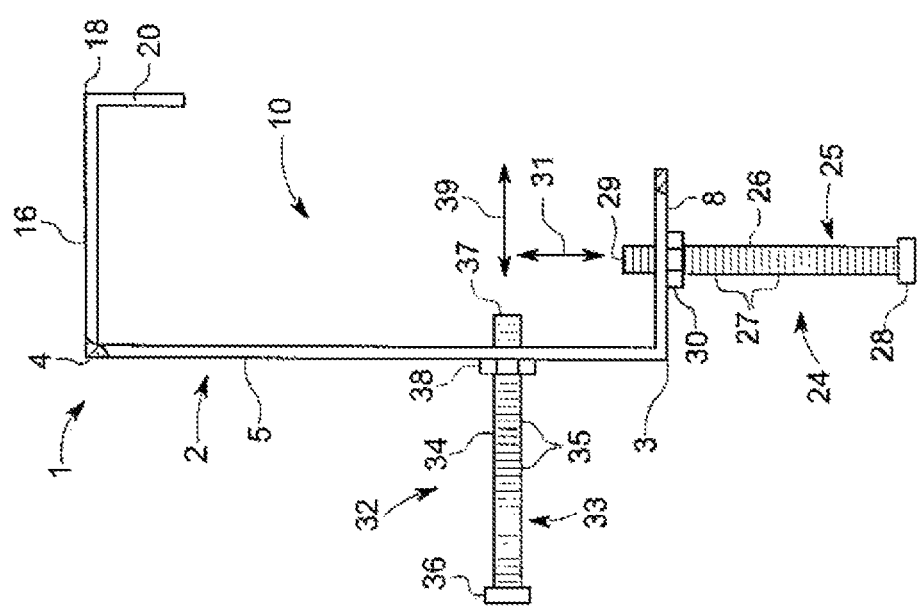
FIG. 3 is a right-side view of the illustrative bead band clamp.

A band portion 16 may extend from the band end edge 4 of the main clamp portion 2. In some embodiments, the band portion 16 may be planar. An elongated distal band portion edge 18 may terminate the band portion 16. As illustrated in FIGS. 2-4, a clamp interior 10 may be formed by and between the main clamp portion 2, the rim portion 8, the band portion 16 and the band engaging flange 20.

At least one band engaging flange 20 may extend from the distal band portion edge 18 of the band portion 16. In some embodiments, the band engaging flange 20 may be planar. The plane of the band engaging flange 20 may be disposed in generally parallel relationship to the plane of the main clamp portion 2 and in generally perpendicular relationship to the plane of the band portion 16. In some embodiments, the main clamp portion 2, the rim portion 8, the band portion 16 and the band engaging flange 20 may be non-planar.

As illustrated in FIG. 4, in some embodiments, the main clamp portion 2 may have a clamp length 42 of about 7 inches. The band portion 16 may have a band portion length 44 of about 4 inches. The rim portion 8 may have a rim portion length 46 of about 3¼ inches. As illustrated in FIG. 5, in some embodiments, the main clamp portion 2 may have a clamp width 48 of about 4 inches. In other embodiments, however, the clamp length 42, the band portion length 44, the rim portion length 46 and the clamp width 48 may have other dimensions depending on the particular application of the bead band clamp 1.

The main clamp portion 2, the rim portion 8, the band portion 16 and the band engaging flange 20 of the bead band clamp 1 may be fabricated of steel, other type of metal, high-density plastic, carbon composite and/or other materials using casting, molding, machining and/or other suitable fabrication methods or techniques known by those skilled in the art.

An inner rim engaging assembly 24 may be provided on the rim portion 8. The inner rim engaging assembly 24 may have any design which facilitates reversible engagement of the bead band clamp 1 with an inner rim surface 57 (FIG. 11) of a front rim flange 52 on the wheel rim 51. In some embodiments, the inner rim engaging assembly 24 may include at least one inner assembly bolt 25. The inner assembly bolt 25 may include an elongated inner assembly bolt shank 26 which extends through an inner assembly bolt opening 80 (FIG. 8) in the rim portion 8. The inner assembly bolt shank 26 may have an inner assembly bolt engagement end 29 which terminates inside the clamp interior 10. An inner assembly bolt head 28 may terminate an exterior end of the inner assembly bolt shank 26.

The inner assembly bolt 25 may threadably engage the rim portion 8 according to any suitable technique which is known by those skilled in the art. In some embodiments, inner assembly bolt threads 27 may be provided on the inner assembly bolt shank 26 between the inner assembly bolt head 28 and the inner assembly bolt engagement end 29. An inner assembly nut 30 may be welded or otherwise attached to the rim portion 8 in aligned or registering relationship to the inner assembly bolt opening 80. Accordingly, the inner assembly bolt threads 27 on the inner assembly bolt shank 26 may threadably engage companion nut threads (not illustrated) in the inner assembly nut 30 to facilitate selective rotational adjustment of the inner assembly bolt shank 26 along an inner engagement axis 31 (FIG. 3) in the clamp interior 10. The inner assembly bolt engagement head 28 may facilitate engagement of a wrench (not illustrated) with the inner assembly bolt shank 26 to facilitate rotation of the inner assembly bolt 25 in the inner assembly nut 30.

A front rim engaging assembly 32 may be provided on the main clamp portion 2. The front rim engaging assembly 32 may have any design which facilitates reversible engagement of the bead band clamp 1 with a front rim surface 56 (FIG. 1) of the front rim flange 52 on the wheel rim 51. In some embodiments, the front rim engaging assembly 32 may have a design which is the same as or similar to that of the inner rim engaging assembly 24. Accordingly, the front rim engaging assembly 32 may include at least one front assembly bolt 33. The front assembly bolt 33 may include an elongated front assembly bolt shank 34 which extends through a front assembly bolt opening 82 (FIG. 8) in the main clamp portion 2. The front assembly bolt shank 34 may have a front assembly bolt engagement end 37 which terminates inside the clamp interior 10. A front assembly bolt head 36 may terminate an exterior end of the front assembly bolt shank 34.

The front assembly bolt 33 may threadably engage the main clamp portion 2 according to any suitable technique which is known by those skilled in the art. In some embodiments, front assembly bolt threads 35 may be provided on the front assembly bolt shank 34 between the front assembly bolt head 36 and the front assembly bolt engagement end 37. A front assembly nut 38 may be welded or otherwise attached to the main clamp portion 2 in aligned or registering relationship to the front assembly bolt opening 82. Accordingly, the front assembly bolt threads 35 on the front assembly bolt shank 34 may threadably engage companion nut threads (not illustrated) in the front assembly nut 38 to facilitate selective adjustment of the front assembly bolt shank 34 along a front engagement axis 39 (FIG. 3) in the clamp interior 10. As further illustrated in FIG. 3, the front engagement axis 39 of the front assembly bolt 33 may be perpendicular to the inner engagement axis 31 of the inner assembly bolt 25. The front assembly bolt engagement head 36 may facilitate engagement of a wrench (not illustrated) with the front assembly bolt shank 34 to facilitate rotation of the front assembly bolt 33 in the front assembly nut 38.

Figure 8:
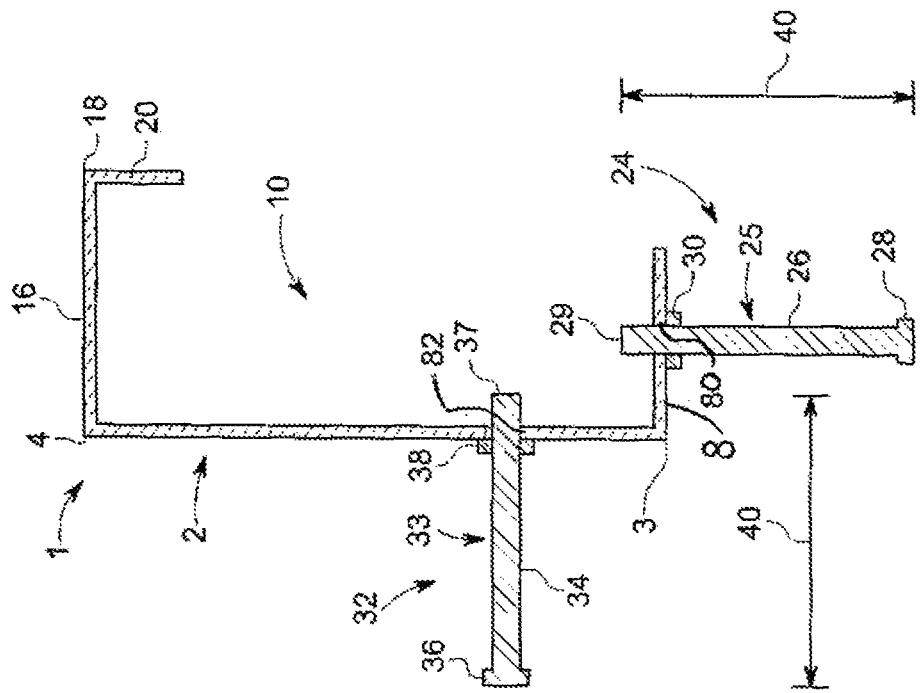
FIG. 8 is a longitudinal sectional view, taken along section lines 8-8 in FIG. 7, of the illustrative bead band clamp.
Figure 7:
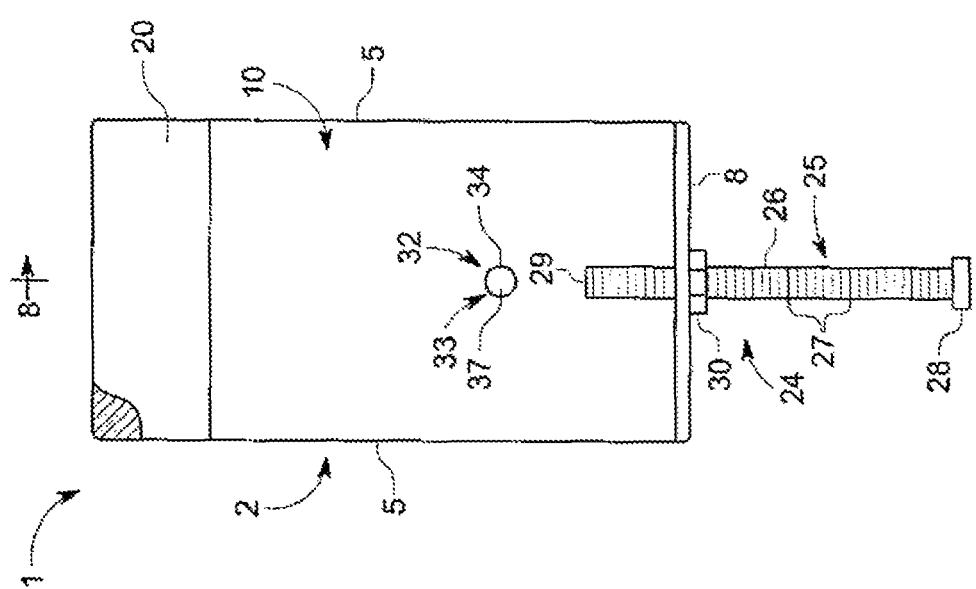
FIG. 7 is a front view of the illustrative bead band clamp.

As illustrated in FIG. 8, in some embodiments, the inner assembly bolt 25 of the inner rim engaging assembly 24 and the front assembly bolt 33 of the front rim engaging assembly 32 may each have a bolt length 40 of about 5½ inches. In other embodiments, however, the bolt length 40 of the inner assembly bolt 25 and the front assembly bolt 33 may have other dimensions depending on the particular application of the bead band clamp 1.

Referring next to FIGS. 9-15 of the drawings, in typical application, at least one band bead clamp 1 may be deployed on the wheel assembly 50 of a vehicle such as an off-the-road (OTR) vehicle, for example and without limitation, to facilitate inflation of the tire 76 (illustrated in phantom in FIGS. 9 and 10) on the wheel rim 51 of the wheel assembly 50. In some applications, the wheel assembly 50 may be provided on an earth-moving vehicle which may be used to transport large volumes of earth in mining or other industrial applications. Such vehicles may require the use of large off-the-road (OTR) tires 76. In other applications, the wheel assembly 50 may be provided on other types of vehicles of various sizes.

Figure 10:
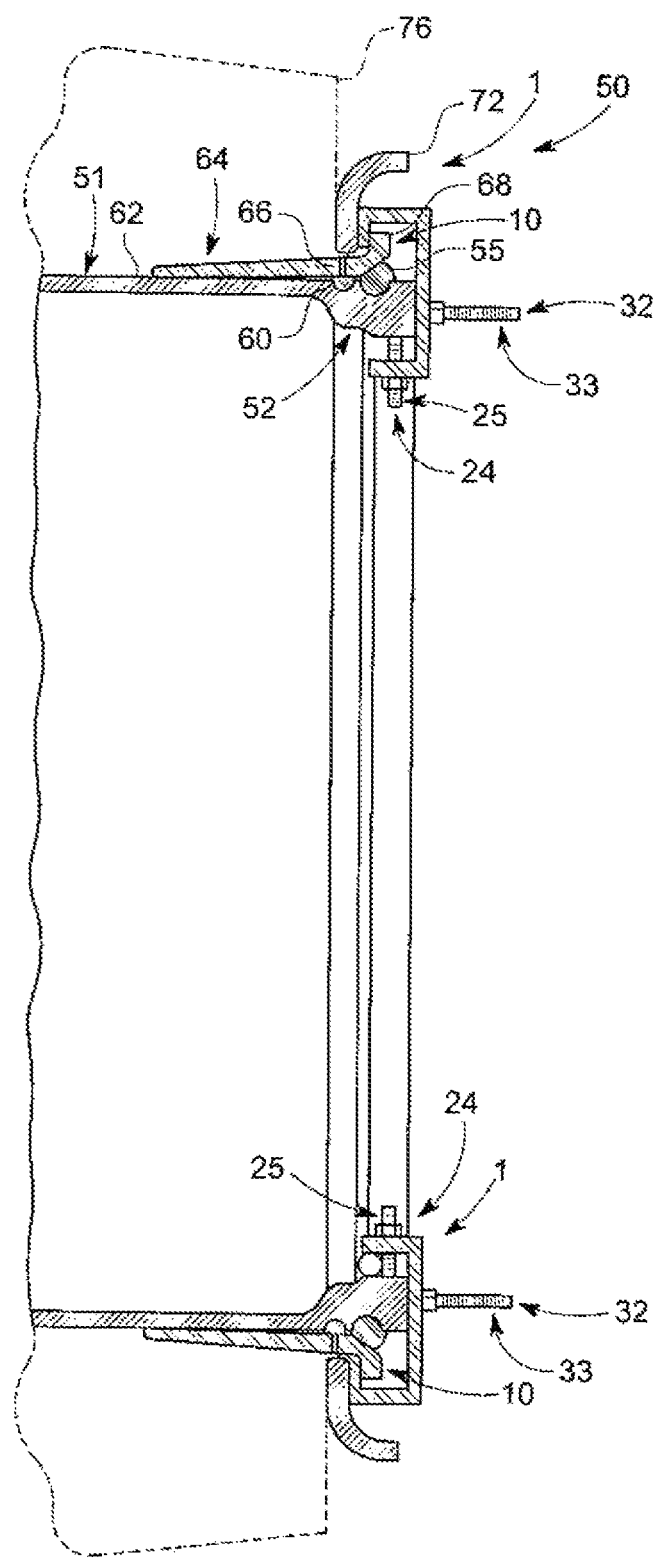
FIG. 10 is a cross-sectional view of a front portion of the wheel assembly with the bead band clamps (also in section) deployed in place and holding the front bead seat band in the inflation position on the wheel rim of the wheel assembly as a tire (illustrated in phantom) on the wheel rim is inflated.
Figure 11:
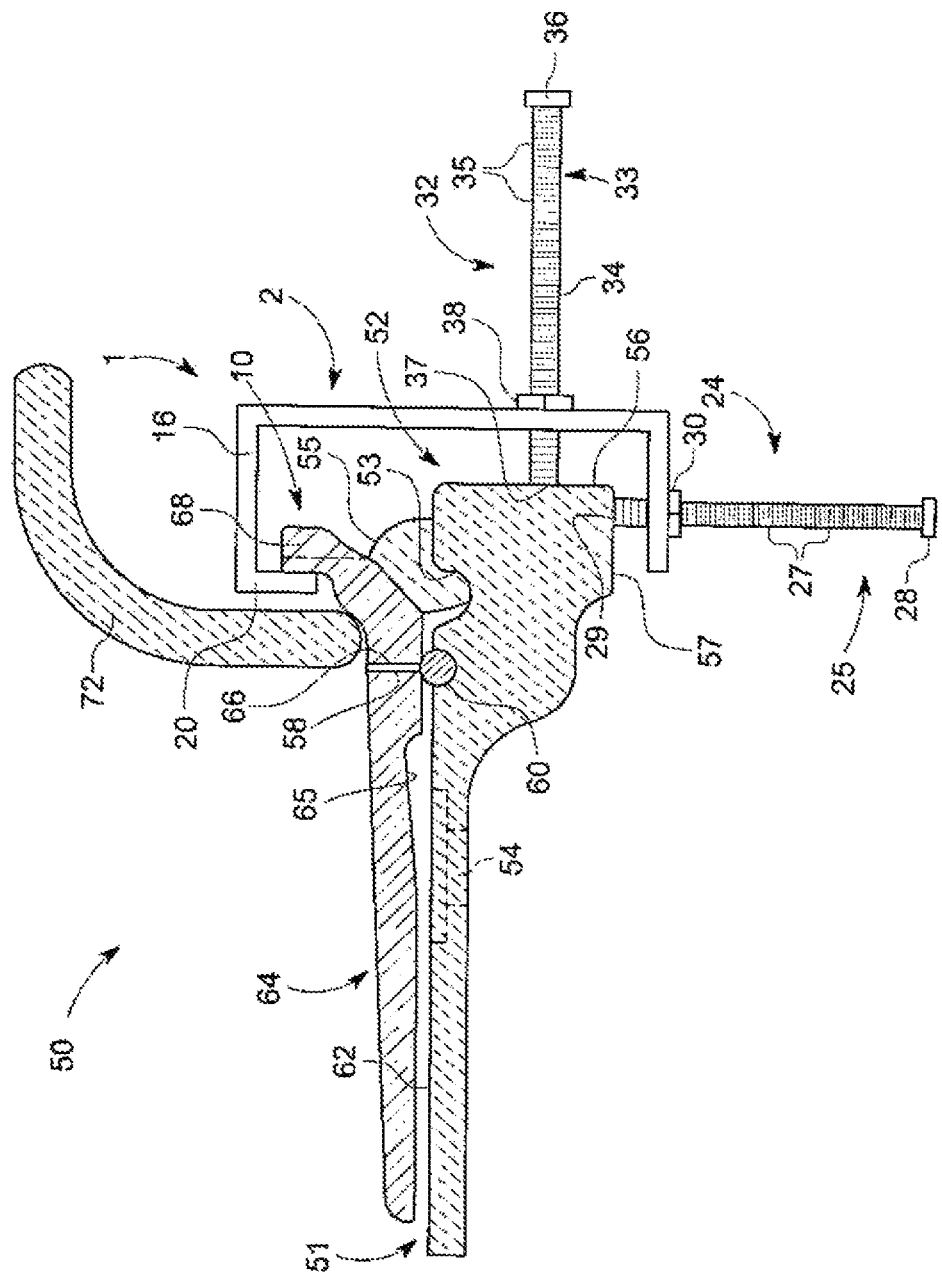
FIG. 11 is an enlarged sectional view of the wheel assembly with a bead band clamp deployed in place and holding a front bead seat band in the inflation position over a front O-ring in typical implementation of the bead band clamps and tire inflation methods.

While the following description applies to elements or components at the front of the wheel assembly 50, some or all of the same corresponding elements or components may be present at the rear of the wheel assembly 50. As illustrated in FIGS. 10 and 11, the wheel rim 51 may have an outer rim surface 62. A front rim flange 52 may terminate the front outer circumferential edge of the wheel rim 51. The front rim flange 52 may have a front rim flange surface 56 and an inner rim flange surface 57 which may be generally perpendicular to the front rim flange surface 56. An annular front lock ring groove 53 may extend into the outer rim surface 62 behind the front rim flange surface 56. A front lock ring 55 may be seated in the front lock ring groove 53. A front O-ring groove 58 may extend into the outer rim surface 62 behind the front lock ring groove 53. A front O-ring 60 may be seated in the front O-ring groove 58.

A radially-expandable, annular front bead seat band 64 may be positioned on the wheel rim 51 over the front lock ring 55 and the front O-ring 60. The front O-ring 60 may seal the interface between the outer rim surface 62 of the wheel rim 51 and the front bead seat band 64. The front bead seat band 64 may have a band flange 68 which circumscribes the front lock ring 55.

An annular front retainer flange 72 may be positioned on the front bead seat band 64. The tire 76 may be mounted on the wheel rim 51 behind the front retainer flange 72. As illustrated in FIG. 11, an inflation port 54 may be provided in the wheel rim 51. The inflation port 54 may open to the outer rim surface 62. An annular bead space 65 may be formed by and between the outer rim surface 62 of the wheel rim 51 and the front bead seat band 64 and may communicate with the inflation port 54. The interior of the tire 76 may communicate with the bead space 65 as pressurized air flows from the inflation port 54 and radially expands the front bead seat band 64 circumferentially outwardly. The air may thus flow through the bead space 65 at the interface between the outer rim surface 62 and the front bead seat band 64 and into the interior of the tire 76, respectively. Upon termination of the flow of air into the tire interior, the front bead seat band 64 may recoil circumferentially inwardly against the outer rim surface 62 to form an airtight seal and prevent leakage of air from the tire 76 back through the inflation port 54. The front lock ring 55 may prevent the front bead seat band 64 from inadvertently sliding off the front of the wheel rim 51.

As illustrated in FIG. 11, at least one radial port 66 may extend through the front bead seat band 64. When the front bead seat band 64 is in an inflation position on the wheel rim 51, as illustrated in FIGS. 10, 11 and 13-15, the radial ports 66 may align or register with the front O-ring 60. Accordingly, as the tire 76 is inflated, the front O-ring 60 may ensure that the pressurized air flows from the inflation port 54 through the head space 65 and into the tire 76, respectively, rather than through the radial ports 66 to the atmosphere.

Figure 12:
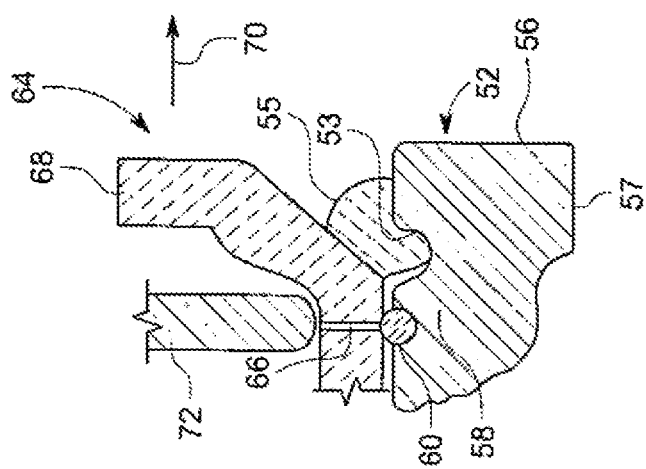
Figure 15:
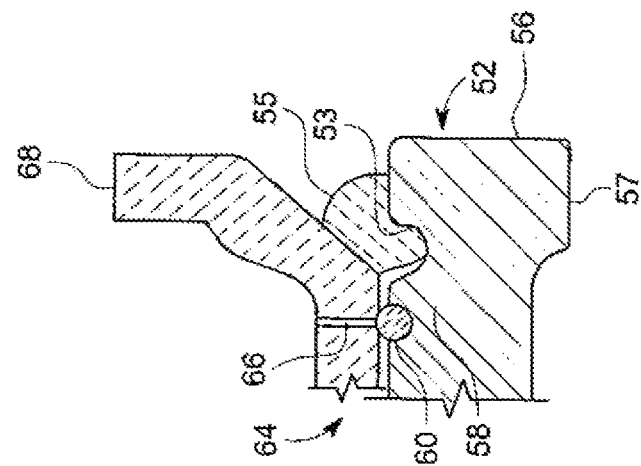
Figure 14:
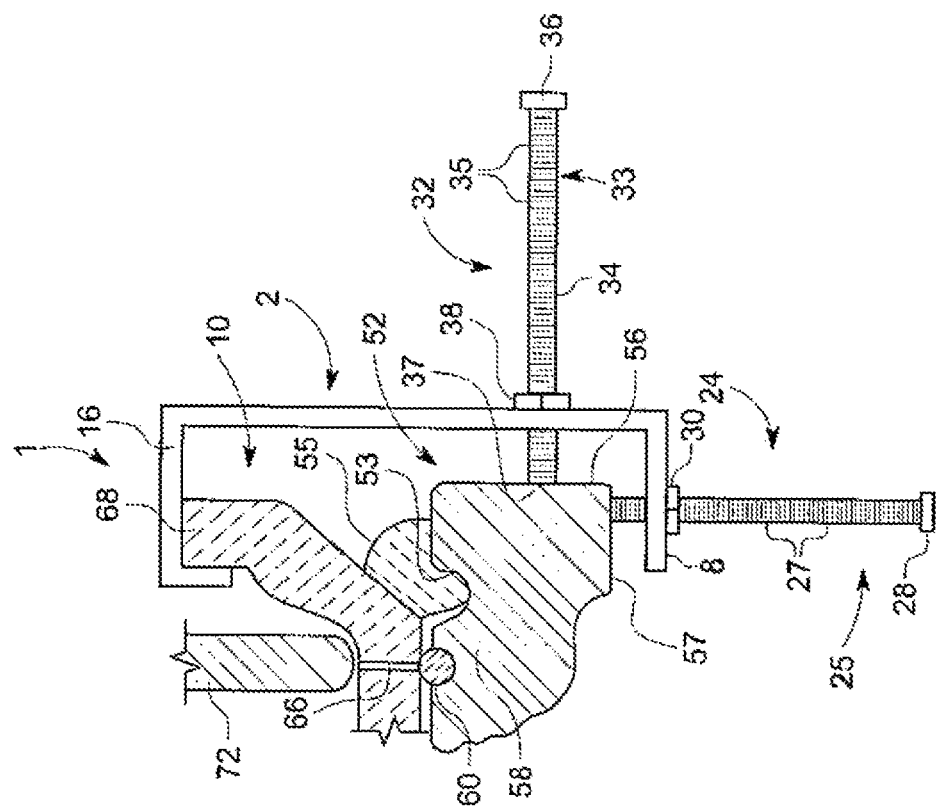

During tire inflation, the front bead seat band 64 may have a tendency to slip from the inflation position on the wheel rim 51. Therefore, as illustrated in FIG. 12, rather than aligning or registering with the front O-ring 60, the radial ports 66 may communicate with the bead space 65 (FIG. 11) at the interface between the outer rim surface 62 and the front bead seat band 64. Accordingly, the pressurized air may flow from the inflation port 54 to the atmosphere instead of into the tire 76. It may thus be necessary to position and retain the front bead seat band 64 in the inflation position on the wheel rim 51 to ensure inflation of the tire 76. To this end, at least one bead band clamp 1 may be applied to the front bead seat band 64 and the wheel rim 51 to hold or maintain the front bead seat band 64 in the inflation position on the wheel rim 51 to ensure inflation of the tire 76.

As illustrated in FIG. 12, prior to application of the bead band clamp 1 to the wheel assembly 50, the front bead seat band 64 may be out of the inflation position on the wheel rim 51. Accordingly, a user (not illustrated) of the bead band clamp 1 may initially grasp the uninflated tire 76 and pull the tire 76 on the wheel rim 51 in the forward direction toward the user, as indicated by the forward arrow 70 in FIG. 12. This action may cause the front bead seat band 64 to slide over the front O-ring 60 until the radial ports 66 in the front bead seat band 64 align or register with the front O-ring 60. Accordingly, as illustrated in FIG. 11, the bead space 65 communicates with the inflation port 54 in the wheel rim 51 and the front O-ring 60 seals the bead space 65 from the radial ports 66 and the atmosphere.

Figure 9:
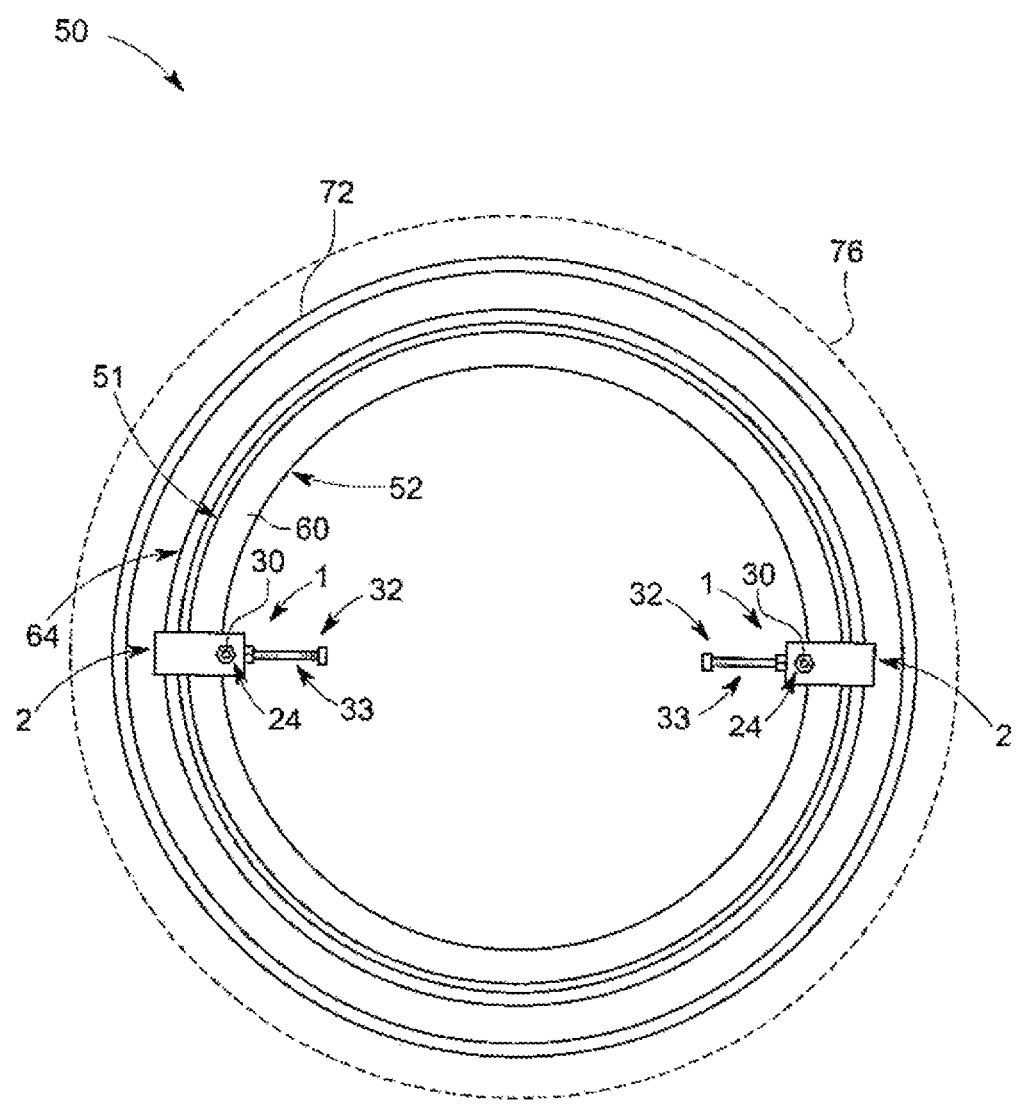
FIG. 9 is a front view of a typical wheel assembly of an off-the-road (OTR) vehicle with a pair of the bead band clamps deployed in place on the wheel assembly in typical implementation of the bead band clamps and tire inflation methods.
Figure 13:
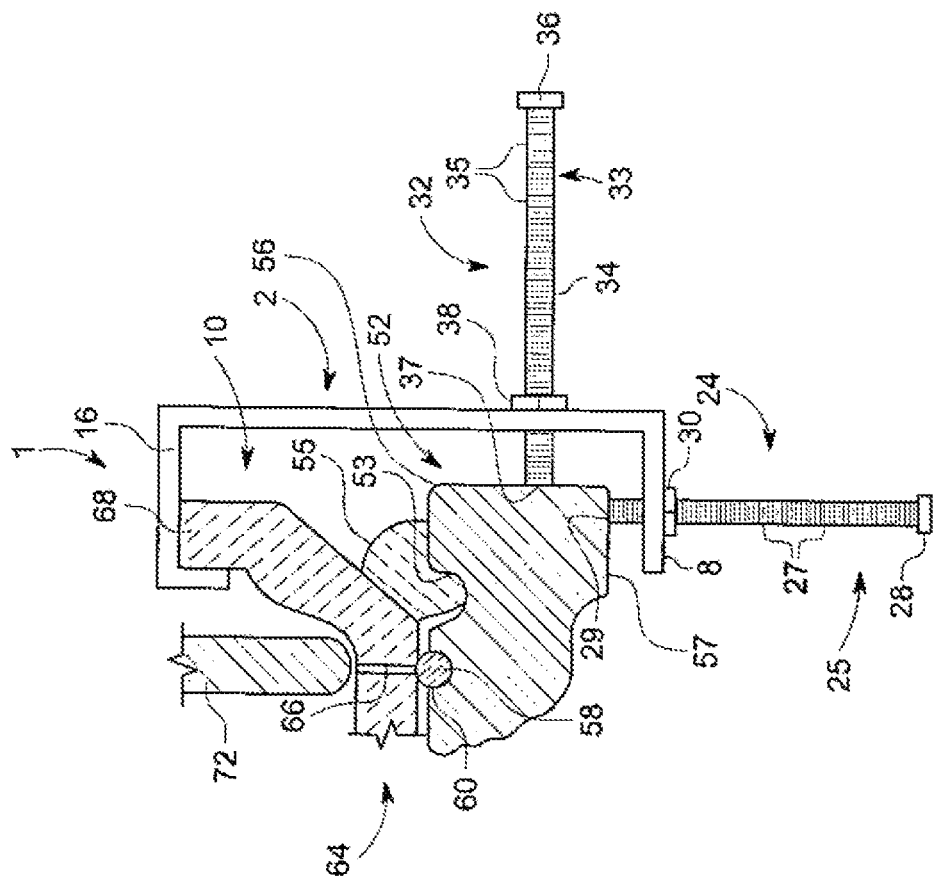
FIGS. 12-15 are enlarged sectional views of the wheel assembly, more particularly illustrating typical sequential application of a bead band clamp to hold the bead seat band in the inflation position during tire inflation.

As illustrated in FIG. 13, the bead band clamp 1 may next be deployed in place on the wheel assembly 50 to hold the front bead seat band 64 in the inflation position on the wheel rim 51. This may be accomplished by initially inserting the band engaging flange 20 on the band portion 16 of the bead band clamp 1 between the band flange 68 of the front bead seat band 64 and the front retainer flange 72 and in engagement with the band flange 68. The band portion 16 may thus extend from the band engaging flange 20 forwardly exterior to the band flange 68 of the front bead seat band 64 and the front lock ring 55. The main clamp portion 2 may extend in front of and spaced-apart relationship to the front rim flange surface 56 and the rim portion 8 interior and in spaced-apart relationship to the inner rim flange surface 57. As illustrated in FIGS. 9 and 10, in some applications, a pair of bead band clamps 1 may be deployed in place on the wheel assembly 50 in spaced-apart relationship to each other. For example and without limitation, in some applications, the bead band clamps 1 may be deployed in 180-degree relationship to each other on the wheel assembly 50.

The inner rim engaging assembly 24 may next be adjusted to engage the inner rim flange surface 57 of the front rim flange 52. In some embodiments, this may be accomplished by threading the inner assembly bolt 25 in the inner assembly nut 30 along the inner engagement axis 31 (FIG. 3) until the inner assembly bolt engagement end 29 of the inner assembly bolt shank 26 engages the inner rim flange surface 57. In like manner, the front rim engaging assembly 32 may be adjusted to engage the front rim flange surface 56 by threading the front assembly bolt 33 in the front assembly nut 38 along the front engagement axis 39 (FIG. 3) until the front assembly bolt engagement end 37 of the front assembly bolt shank 34 engages the front rim flange surface 56. A wrench (not illustrated) may be used to rotate the inner assembly bolt 25 and the front assembly bolt 33 by engagement with the respective inner assembly bolt head 28 and front assembly bolt head 36. By progressively threading the front assembly bolt 33 against the front rim flange surface 56, the band engaging flange 20 on the band portion 16 may progressively pull the front bead seat band 64 forwardly on the wheel rim 50 to achieve a snug fit of the band flange 68 against the front lock ring 55 and ensure that the radial ports 66 in the front bead seat band 64 remain in place over the front O-ring 60. The user may next push the tire 76 rearwardly on the wheel rim 51 to ensure that the rear bead seat band (not illustrated) is sealed against the rear O-ring (not illustrated) typically in a similar manner.

The tire 76 may next be inflated by connecting a tire inflation pump (not illustrated) to the inflation port 54 (FIG. 11) typically in the conventional manner. The tire inflation pump may be operated to introduce pressurized air into the inflation port 54 and through the bead space 65 at the interface between the front bead seat band 64 and the outer rim surface 62 of the wheel rim 51 as the force of the pressurized air typically radially expands the front bead seat band 64 circumferentially outwardly from the outer rim surface 62. The front O-ring 60 continues to seal the bead space 65 from the radial ports 66 and the atmosphere to ensure that the pressurized air continues to flow into the tire 76 rather than from the bead space 65 through the radial ports 66 to the atmosphere.

When inflation of the tire 76 is completed, each bead band clamp 1 may be removed from the wheel assembly 50. This may be accomplished by disengaging the inner rim engaging assembly 24 from the inner rim flange surface 57 and the front rim engaging assembly 32 from the front rim flange surface 56 of the front rim flange 52. The band engaging flange 20 may be removed from between the front retainer flange 72 and the band flange 68 of the front bead seat band 64. The same procedure may subsequently be applied to each of the wheel assemblies 50 on the vehicle until all the tires 76 on the respective wheel assemblies 50 are inflated.

Figure 16:
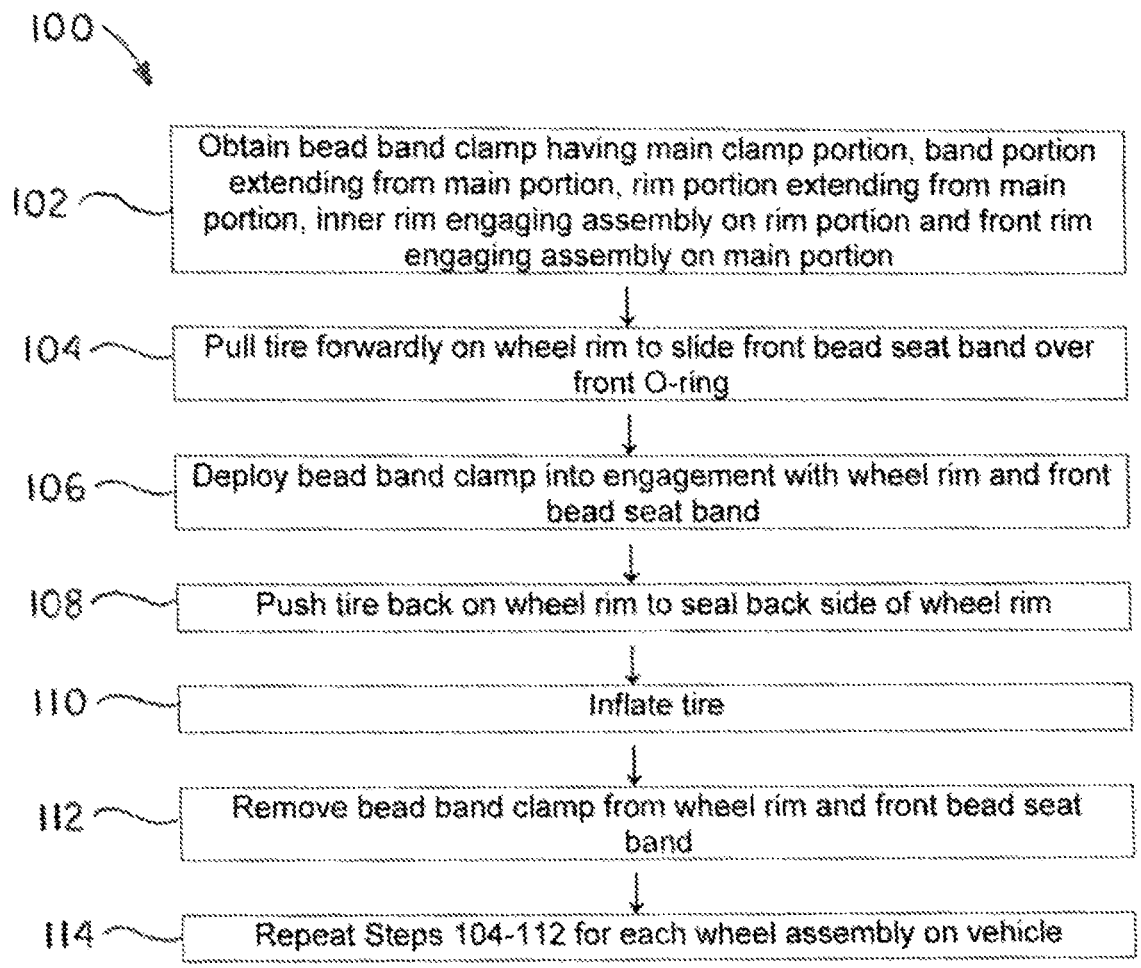
FIG. 16 is a flow diagram of an illustrative embodiment of the tire inflation methods.

Referring next to FIG. 16 of the drawings, a flow diagram 100 of an illustrative embodiment of the tire inflation methods is illustrated. At Step 102, at least one bead band clamp may be obtained. In some applications, each bead band clamp may include a main clamp portion, a band portion extending from the main clamp portion, a rim portion extending from the main clamp portion, an inner rim engaging assembly on the rim portion and a front rim engaging assembly on the main clamp portion.

At Step 104, a tire may be pulled forwardly on a wheel rim of a wheel assembly on a vehicle to slide a front bead seat band over a front O-ring on the wheel rim.

At Step 106, at least one bead band clamp may be deployed into engagement with the front bead seat band and the wheel rim. In some applications, a pair of bead band clamps may be deployed into engagement with the front bead seat band and the wheel rim in spaced-apart relationship to each other. The bead band clamps may be disposed in 180-degree relationship to each other on the wheel assembly. Engagement of each bead band clamp with the front bead seat band may be accomplished by engagement of a band engaging flange on the band portion of the bead band clamp with a band flange on the front bead seat band. Engagement of each bead band clamp with the wheel rim may be accomplished by engagement of an inner rim engaging assembly on the rim portion of the bead band clamp against an inner rim flange surface on a front rim flange of the wheel rim and by engagement of a front rim engaging assembly on the main clamp portion of the bead band clamp against a front rim flange surface on the front rim flange of the wheel rim.

At Step 108, the tire may be pushed rearwardly on the wheel rim to seal the back side of the wheel rim.

At Step 110, the tire may be inflated.

At Step 112, the bead band clamp may be removed from the wheel rim and the front bead seat band.

At Step 114, Steps 104-112 may be repeated for each wheel assembly on the vehicle until each tire on the vehicle is inflated.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A bead band clamp for holding a front bead seat band in an inflation position on a wheel rim of a vehicle to facilitate inflation of a tire on the wheel rim, the bead band clamp comprising:
   a main clamp portion including a first portion and a second portion;
   a band portion connected to the second portion of the main clamp portion and extending from the main clamp portion;
   a rim portion connected to the first portion of the main clamp portion and extending from the main clamp portion in spaced-apart relationship to the band portion;
   a band engaging flange extending from the band portion, the band engaging flange having an inner band engaging flange surface, an outer band engaging flange surface and a band engaging flange edge joining the inner band engaging surface and the outer band engaging surface, the band engaging flange having an edge width corresponding to a distance between the inner band engaging flange surface and the outer band engaging flange surface, the band engaging flange configured to insert in a gap between a band flange on the front bead seat band and a front retainer flange positioned on the front bead seat band, the gap substantially corresponding to the edge width of the band engaging flange edge;
   a first rim engaging assembly carried by the rim portion, the first rim engaging assembly having a first axis of engagement; and
   a second rim engaging assembly carried by the main clamp portion wherein said second rim engagement assembly is proximally located near the first portion of the main clamp portion, the second rim engaging assembly having a second axis of engagement perpendicular to the first axis of engagement of the first rim engaging assembly.

2. The bead band clamp of claim 1 wherein the main clamp portion comprises a rim end edge and a band end edge opposite the rim end edge, and the band portion extends from the band end edge and the rim portion extends from the rim end edge.

3. The bead band clamp of claim 1 wherein the first rim engaging assembly comprises an assembly bolt threadably carried by the rim portion.

4. The bead band clamp of claim 1 wherein the second rim engaging assembly comprises an assembly bolt threadably carried by the main clamp portion.

5. The bead band clamp of claim 1 further comprising a bead engaging flange extending from the band portion in spaced-apart, parallel relationship to the main clamp portion.

6. The bead band clamp of claim 1 wherein the main clamp portion has a clamp length of about 7 inches, the band portion has a band portion length of about 4 inches and the rim portion has a rim portion length of about 3¼ inches.

* * * * *